(12) United States Patent
Aljadeff

(10) Patent No.: US 10,771,923 B2
(45) Date of Patent: Sep. 8, 2020

(54) METHODS AND SYSTEMS FOR THE LOCATION AND MONITORING OF MOBILE UNITS

(71) Applicant: Daniel Aljadeff, Kiriat Ono (IL)

(72) Inventor: Daniel Aljadeff, Kiriat Ono (IL)

( * ) Notice: Subject to any disclaimer, the term of this patent is extended or adjusted under 35 U.S.C. 154(b) by 0 days.

(21) Appl. No.: 16/316,559

(22) PCT Filed: Jul. 10, 2017

(86) PCT No.: PCT/IL2017/050777
§ 371 (c)(1),
(2) Date: Jan. 9, 2019

(87) PCT Pub. No.: WO2018/011792
PCT Pub. Date: Jan. 18, 2018

(65) Prior Publication Data
US 2019/0297462 A1    Sep. 26, 2019

Related U.S. Application Data

(60) Provisional application No. 62/361,166, filed on Jul. 12, 2016.

(51) Int. Cl.
*H04W 4/029*        (2018.01)
*B64C 39/02*        (2006.01)
(Continued)

(52) U.S. Cl.
CPC ........... *H04W 4/029* (2018.02); *B64C 39/024* (2013.01); *G01S 5/0081* (2013.01); *G01S 5/02* (2013.01);
(Continued)

(58) Field of Classification Search
CPC .... H04W 4/023; H04W 4/029; B64C 39/024; B64C 2201/12; B64C 2201/024;
(Continued)

(56) References Cited

U.S. PATENT DOCUMENTS 9,373,014 B1    6/2016  Mehranfar
9,571,978 B1 *  2/2017  Ananth ................ H04W 4/023
(Continued)

FOREIGN PATENT DOCUMENTS

CN      102608567 A     7/2012
JP      2000 356673 A   12/2000
(Continued)

OTHER PUBLICATIONS

International Preliminary Report on Patentability for PCT/IL2017/050777, report completed on Nov. 7, 2018—19 pages.
(Continued)

*Primary Examiner* — Quoc Thai N Vu
(74) *Attorney, Agent, or Firm* — Roach, Brown, McCarthy & Gruber, P.C.; Kevin D. McCarthy

(57) ABSTRACT

This disclosure provides methods and systems for locating wireless mobile devices in an area, for example, using an unmanned aerial vehicle. An unmanned aerial vehicle may receive a wireless signal with identification information from a mobile device. The unmanned aerial vehicle may fly in wireless communication range with the mobile device; measuring, representative parameters related to the received wireless signal and associating the value of measured representative parameters with the mobile device identification and with the location of the unmanned aerial vehicle at the time the wireless signal was received and estimating, the location of the mobile device in the area based on the value of measured representative parameters and the location of the unmanned aerial vehicle at the time it received the wireless signal. The measurement of the representative parameters may be time-stamped and the location of the unmanned aerial vehicle at the time the wireless signal was received may be calculated based on the time stamp and flight information of the unmanned aerial vehicle.

7 Claims, 6 Drawing Sheets

(51) Int. Cl.
  *G01S 5/10* (2006.01)
  *G01S 19/13* (2010.01)
  *G01S 13/86* (2006.01)
  *G01S 13/76* (2006.01)
  *G01S 5/02* (2010.01)
  *G01S 13/88* (2006.01)
  *G01S 5/00* (2006.01)
  *H04B 7/185* (2006.01)

(52) U.S. Cl.
  CPC ......... *G01S 5/0263* (2013.01); *G01S 5/0284* (2013.01); *G01S 5/10* (2013.01); *G01S 13/765* (2013.01); *G01S 13/867* (2013.01); *G01S 13/88* (2013.01); *G01S 19/13* (2013.01); *B64C 2201/024* (2013.01); *B64C 2201/042* (2013.01); *B64C 2201/12* (2013.01); *B64C 2201/127* (2013.01); *B64C 2201/141* (2013.01); *B64C 2201/146* (2013.01); *H04B 7/18539* (2013.01)

(58) Field of Classification Search
  CPC ........ B64C 2201/042; B64C 2201/127; B64C 2201/141; B64C 2201/146; G01S 5/10; G01S 19/13; G01S 13/878; G01S 5/02; G01S 5/0263; G01S 5/0284; G01S 5/0081; G01S 13/765; G01S 13/867; G01S 13/88; H04B 7/18539
  See application file for complete search history.

(56) References Cited

U.S. PATENT DOCUMENTS

| | | | |
|---|---|---|---|
| 2003/0028286 A1* | 2/2003 | Glenn | B25J 9/1689 700/245 |
| 2012/0235864 A1 | 9/2012 | Lu | |
| 2012/0271491 A1* | 10/2012 | Spata | G01W 1/00 701/3 |
| 2015/0266577 A1 | 9/2015 | Jones et al. | |

FOREIGN PATENT DOCUMENTS

| | | |
|---|---|---|
| KR | 20160072081 A | 6/2016 |
| WO | 2015/158265 A1 | 10/2015 |

OTHER PUBLICATIONS

Claire Swedberg; RFID—Reading Drone Tracks Structural Steel Products in Storage Yard, http://www.rfidjournal.com/articles/view?12209, Sep. 26, 2014, 3 pages.
International Search Report for PCT/IL2017/050777, dated Oct. 3, 2017—4 pages.
Written Opinion of the International Searching Authority for PCT/IL2017/050777, dated Oct. 3, 2017—5 pages.
Communication and Supplementary European Search Report for EP 17 82 7118; dated Jun. 17, 2019; 8 pages.

* cited by examiner

METHODS AND SYSTEMS FOR THE LOCATION AND MONITORING OF MOBILE UNITS

FIELD OF THE INVENTION

The present invention relates to network communications, including, methods and systems for associating a wireless tag with an asset.

BACKGROUND OF THE DISCLOSURE

The ability to locate and track assets, such as devices, products, persons, equipment, vehicles, etc. is important in many applications and industries. For example, in construction areas someone may wish to track equipment (e.g. equipment, tools), manufacturers may wish to track parts in an assembly plant and warehouses may wish to track supplies. In some applications, assets may be monitored using wireless tags that communicate using wireless signals from a transceiver device. In such applications, a wireless tag may be attached to an asset and may be configured to transmit information to a transceiver. The information may comprise device identification, telemetry and even location information associated with the tag. In other applications, mobile phones are located and tracked instead or in addition to tags.

In some cases, the transceivers that are in communication with the mobile devices (e.g. tags, smartphones, wearable devices, laptops, tablets, etc.) may be fix-installed in a known place. The known place of the transceivers may be used by the location or tracking system to estimate the position of the mobile device (e.g. tag, phone, wearable device, laptop, etc.). Received Signal Strength (RSS), Time-of-Arrival (TOA), Angle-of-Arrival (AoA), two-way ranging and other techniques are commonly used to estimate the position of the mobile device.

Problems can arise, however, when the deployment of transceivers in fixed places (e.g. poles or buildings) in a certain area is not cost effective, not feasible or even not permitted. For example, this may be the situation when locating assets in a construction site where it may be expensive to fix install those transceivers, even when they are battery operated. In another example, the radio regulations of a specific country may not allow the transmission of certain wireless signals (e.g. UWB) from static devices operating outdoors.

Accordingly, methods and systems consistent with the disclosed embodiments provide an improved method to locate mobile devices in certain type of areas.

SUMMARY OF THE INVENTION

The disclosed embodiments comprise a method of using unmanned aerial vehicles (UAV), commonly known as drones to locate and track mobile devices in a specific area.

In one aspect, the method for locating a mobile device in an area, may comprise: receiving, by an unmanned aerial vehicle (UAV) flying in wireless communication range with the mobile device, a wireless signal (e.g. in accordance with IEEE802.11a/b/g/n/ac/ad, IEEE802.15.4, IEEE802.15.4a, Bluetooth 4.0/5.0, Wireless HART, NB-IoT, LTE Cat0 for M2M, LTE-M Rel. Cat-0, Cat-1 and Cat-4, LoRaWAN™, Low Power Wide Area Network (LPWAN), SIGFOX, Weightless-N, Weightless-P, Weightless-W, Z-Wave, or with any other wireless transmission protocol) from a mobile device, wherein the wireless signal may comprise identification information of the mobile device (e.g. tag ID, MAC address, or other similar identifying information), measuring, by the unmanned aerial vehicle a representative parameter related to the wireless signal (e.g. Received Signal Strength-RSS, Time of Arrival (TOA), Angle of Arrival-AoA, etc.) as received by the unmanned aerial vehicle; associating, by the unmanned aerial vehicle, the value of the measured representative parameter with the mobile device identification and with the location of the unmanned aerial vehicle (e.g. using its on-board GPS receiver) at the time the wireless signal was received and estimating, by the unmanned aerial vehicle, the location of the mobile device in the area based on the value of the measured representative parameter and the location of the unmanned aerial vehicle at the time it received the wireless signal.

The disclosed embodiments also comprise a method which may further comprise establishing communication between the unmanned aerial vehicle and a computer, the computer separated from the unmanned aerial vehicle (i.e. not physically located on the UAV) and reporting to the computer, by the unmanned aerial vehicle, the identification and the estimated location of the mobile device.

Another embodiment may comprise reporting to the computer, by the unmanned aerial vehicle, the mobile device information, the associated measured value of the representative parameter (e.g. RSS, AoA, etc.) and the associated UAV location, where this information may be processed by the computer and used to display on a map the location of the mobile device (e.g. RFID tag) and/or to report the mobile device location to a third party (e.g. textual location report).

The disclosed embodiments also comprise a method for locating mobile devices in a certain area using a UAV, wherein the method may further comprise time-stamping, by the unmanned aerial vehicle, the measurement of the representative parameter and calculating, by the unmanned aerial vehicle, the location of the unmanned aerial vehicle at the time the wireless signal was received, based on the time stamp, flight information and/or sensors information of the unmanned aerial vehicle.

The disclosed embodiments also include a method for locating mobile assets in a certain area using a UAV, wherein the method may further comprise pointing, by the unmanned aerial vehicle, an on-board imaging device to the estimated location of the mobile device in the area, the pointing based on the estimated location of the mobile device and the location and orientation of the unmanned aerial vehicle; capturing, by the on-board imaging device, at least one image of the area in which the mobile device is located; associating the at least one image with the mobile device identification and reporting the at least one image to a computer (e.g. a server).

The disclosed embodiments also include a method for locating mobile assets in a certain area using a UAV, wherein the UAV may measure a representative parameter (e.g. RSS, TOA, etc.) of wireless signals from the mobile device when the UAV is at a plurality of locations in that area. Each measurement (e.g. RSS) may be associated with the respective UAV location (e.g. using global coordinates) and then reported to a computer (e.g. server). The computer may calculate the location of the mobile device using multiple measurements which were measured at different UAV locations, thus achieving better location accuracy. In another embodiment, the computer may use the UAV flight information to calculate its absolute position when each of the reported measurements was performed.

The disclosed embodiments may also include a method for locating mobile devices in a certain area using a UAV, wherein the UAV may measure the received signal strength (RSS) of a plurality of tags and other mobile devices when the UAV is at a plurality of locations in that area. Each RSS measurement from each mobile device may be associated with the respective UAV location (e.g. using global coordinates) and then reported to a computer (e.g. a server). The computer may calculate the location of the mobile devices using multiple RSS measurements measured from different UAV locations.

In another embodiment, the UAV may perform with the mobile devices measurements which may require transmission and reception of wireless signals between the UAV and the mobile device. For example, the UAV may perform with one or a plurality of mobile devices, two-way ranging (TWR), symmetrical double sided-two-way ranging (SDS-TWR), measurements based on TOA (Time of Arrival) and TOT (Time of Transmission) of wireless signals, measured by both the mobile device and the UAV. For example, using TWR of wireless signals exchanged between the UAV and a tag, allows estimating the distance between both units. The UAV may associate the TWR measurement values or the estimated distance to each of the tags including associating the corresponding location of the UAV at the time of each of the TWR measurements. Also according to this embodiment, the estimated range or the measured TWR information, together with the associated location of the UAV and the mobile device information (e.g. tag ID) may be reported to a computer which may estimate the physical location of each mobile device in the area.

In another embodiment, Angle of Arrival (AoA) measurements of wireless signals transmitted by the mobile devices may be used for location instead or in addition to TOA-based (e.g. TWR, TDOA) and RSS measurements.

Methods disclosed may comprise using different wireless technologies to communicate and perform measurements with the mobile devices (e.g. tags, smartphones, etc.) including WEE802.11a/b/g/n/ac/ad, IEEE802.15.4, IEEE802.15.4a, Bluetooth 4.0/5.0, Wireless HART, NB-IoT, LTE Cat0 for M2M, LTE-M Rel. Cat-0, Cat-1 and Cat-4, LoRaWAN™, Low Power Wide Area Network (LPWAN), SIGFOX, Weightless-N, Weightless-P, Weightless-W, Z-Wave, or any other known wireless network that facilitates wireless communications between elements.

The methods may further comprise using the wireless link to transfer telemetry information from the mobile devices to the UAV or vice versa.

The disclosed embodiments may also include a method for locating mobile devices in a certain area using a UAV wherein mobile devices may be programmed to wake-up and perform measurements with the UAV at certain time(s) of the day or of any other time unit when the UAV may also be programmed to fly over the same area where the mobile devices are. In accordance to another method of the disclosed embodiments, the mobile devices may be in standby mode and monitoring a wireless link at periodic intervals and for short periods of time. When the UAV is in the vicinity of the mobile devices, it may transmit a wake-up signal on a wireless link which may be received by the mobile devices to trigger measurements as previously described. Those wake-up signals may be sent by the UAV using wireless technologies as IEEE802.11a/b/g/n/ac/ad, WEE802.15.4, IEEE802.15.4a, Bluetooth 4.0/5.0, Wireless HART, Low Frequency, or any other known wireless network that facilitates wireless communications between elements as well as diffused infrared, laser and ultrasonic signals. In another embodiment, the wake-up signals may be transmitted by a local transmitter located in communication range with the mobile devices.

The disclosed embodiments may also include a method for locating mobile devices in an area, wherein the method may comprise: receiving, by a plurality of unmanned aerial vehicles (UAVs), wireless signals from a mobile device, the wireless signals comprising identification information of the mobile device, the plurality of unmanned aerial vehicles flying in wireless communication range with the mobile device; measuring, by at least two of the plurality of unmanned aerial vehicles, a representative parameter related to the wireless signal as received by each of the unmanned aerial vehicles; associating, by each of the at least two unmanned aerial vehicles, the measured value of the representative parameter with the mobile device identification and with the location of the unmanned aerial vehicle at the time the wireless signal was received; establishing communication between each of the at least two unmanned aerial vehicles and a computer (e.g. a server, a portable computer, a tablet computer, a smartphone, a computer on another UAV, etc.), the computer separated from the unmanned aerial vehicles; reporting to the computer, by each of the at least two unmanned aerial vehicles, the mobile device identification, the associated measured parameter and the associated location of the unmanned aerial vehicle at the time the wireless signal was received and estimating, by the computer, the location of the mobile device in the area based on the information reported by each of the at least two unmanned aerial vehicles, the information comprising the mobile device identification, the associated measured parameter value and the associated location of the unmanned aerial vehicle at the time the wireless signal was received.

As can be understood by one having ordinary skill in the art, this embodiment has the advantage that measurements of wireless signals related to mobile devices may be performed simultaneously or at short time intervals at a plurality of geographically separated points (i.e. each UAV is in a different location at any given time). This plurality of measurements by different UAV's may allow performing multiple measurements in shorter time (e.g. resulting in a shorter UAV flight time) and with possible fewer transmissions from the mobile devices. In addition, it may improve the location accuracy when the mobile devices may be moving.

The disclosed embodiments may also include a method for locating mobile devices in an area, further comprising time-stamping, by each of the at least two unmanned aerial vehicles, measurements of representative parameters of wireless signals related to the same mobile device; establishing communication between the unmanned aerial vehicle and a computer, the computer separated from the unmanned aerial vehicle (i.e. not physically located on the UAV) and reporting to the computer, by the unmanned aerial vehicle, the identification of the mobile device with the associated measurements and associated locations of each UAV at the time of the measurements.

According to an embodiment, this information may be processed by the computer and used to display on a map the location of the mobile device (e.g. tag) or to report its location to a third party (e.g. textual location report).

The method may further comprise transmitting from the computer to at least one UAV, the estimated location of the mobile device and then pointing, by the UAV, an on-board imaging device to the estimated location of the mobile device in the area, the pointing based on the estimated location of the mobile device and the location and orientation of the unmanned aerial vehicle; capturing, by the on-board imaging device, at least one image of the area in which the mobile device is located; associating the at least one image with the mobile device identification and reporting the at least one image back to the computer (e.g. server).

The disclosed embodiments may also include a method for locating mobile devices in an area, wherein the method may comprise: receiving, by an unmanned aerial vehicle (UAV) wireless signals from a mobile device, the unmanned aerial vehicle flying in wireless communication range with the mobile device, wherein the wireless signals comprising identification information of the mobile device and the wireless signals being transmitted in bursts comprising short (e.g. 500-1,000 usec) and long intervals (e.g. 50-200 msec), wherein the long interval is significantly longer than the short interval; measuring, by the unmanned aerial vehicle the Time of Arrival of wireless signals as received by the unmanned aerial vehicle; associating, by the unmanned aerial vehicle, the Time of Arrival with the mobile device identification and with the respective locations of the unmanned aerial vehicle at the time that each of the wireless signals were received; estimating the time offset between the mobile device clock and the unmanned aerial vehicle clock based on the measured TOA of wireless signals received at short intervals; calculating the TDOA of wireless signals based on the measured TOA of wireless signals received at long intervals and the estimated clock offset; and estimating, the location of the mobile device in the area based on the calculated TDOA values and the respective locations of the unmanned aerial vehicle at the time it received the wireless signals.

The disclosed embodiments may also include a system for locating mobile devices in an area, comprising: at least one mobile device in the area programmed to transmit wireless signals, the wireless signals comprising an identification of the mobile device; and an unmanned aerial vehicle (UAV) flying in communication range with the at least one mobile device, the UAV comprising: a GPS system; wireless communication means able to receive and measure representative parameters of the wireless signals; a memory storing software instructions; and a processor configured to execute the software instructions to perform operations including: measuring, by the unmanned aerial vehicle a representative parameter related to the wireless signal as received by the unmanned aerial vehicle; associating, by the unmanned aerial vehicle, the value of the measured representative parameter with the mobile device identification and with the location of the unmanned aerial vehicle at the time the wireless signal was received; and estimating, by the unmanned aerial vehicle, the location of the mobile device in the area based on the value of the measured representative parameter and the location of the unmanned aerial vehicle at the time it received the wireless signal.

The disclosed embodiments may also include an unmanned aerial vehicle (UAV) for locating mobile devices in an area, wherein the unmanned aerial vehicle (UAV) is flying in communication range with at least one mobile device in the area, the unmanned aerial vehicle comprising: a GPS system; wireless communication means able to receive and measure representative parameters of wireless signals transmitted by the mobile device; a memory storing software instructions; and a processor configured to execute the software instructions to perform operations including: measuring, by the unmanned aerial vehicle a representative parameter related to the wireless signal as received by the unmanned aerial vehicle; associating, by the unmanned aerial vehicle, the value of the measured representative parameter with the mobile device identification and with the location of the unmanned aerial vehicle at the time the wireless signal was received; and estimating, by the unmanned aerial vehicle, the location of the mobile device in the area based on the value of the measured representative parameter and the location of the unmanned aerial vehicle at the time it received the wireless signal.

Other embodiments are disclosed that are configured to perform similar and other aspects than those exemplified above. It is to be understood that the disclosed embodiments are not limited to the details of construction and to the arrangements set forth in the following description or illustrated in the drawings. The disclosed embodiments may comprise additional aspects in addition to those described and are capable of being practiced and carried out in various ways. Also, it is to be understood that the phraseology and terminology employed herein, as well as in the abstract, are for the purpose of description and should not be regarded as limiting.

The accompanying drawings, which are incorporated and constitute part of the specification, illustrate certain embodiments of the disclosure, and together with the description, serve to explain exemplary principles of the disclosed embodiments.

As such, those skilled in the art will appreciate that the conception upon which this disclosure is based may readily be utilized as a basis for designing other structures, methods, and/or systems for carrying out the several purposes of the present disclosure. It is important, therefore, to recognize that the claims should be regarded as including such equivalent constructions insofar as they do not depart from the spirit and scope of the present disclosure.

BRIEF DESCRIPTION OF THE DRAWINGS

The accompanying drawings, which are incorporated in and constitute a part of this specification, illustrate various exemplary aspects of the disclosure and, together with the description, explain disclosed principles.

DETAILED DESCRIPTION

The terminology used herein is for the purpose of describing particular embodiments only and is not intended to be limiting of the invention. As used herein, the term "and/or" includes any and all combinations of one or more of the associated listed items. As used herein, the singular forms "a," "an," and "the" are intended to include the plural forms as well as the singular forms, unless the context clearly indicates otherwise.

It will be further understood that the terms "comprises" and/or "comprising" and/or "includes" and/or "including" when used in this specification, specify the presence of stated features, steps, operations, elements, and/or components, but do not preclude the presence or addition of one or more other features, steps, operations, elements, components, and/or groups thereof.

Unless otherwise defined, all terms (including technical and scientific terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

In describing embodiments of the invention, it will be understood that a number of techniques and steps are disclosed. Each of these has individual benefit and each can also be used in conjunction with one or more, or in some cases all, of the other disclosed techniques. Accordingly, for the sake of clarity, this description will refrain from repeating every possible combination of the individual steps in an unnecessary fashion.

Nevertheless, the specification and claims should be read with the understanding that such combinations are entirely within the scope of the invention.

In the following description, for purposes of explanation, numerous specific details are set forth in order to provide a thorough understanding of the present invention. It will be evident, however, to one skilled in the art that the present invention may be practiced without these specific details.

The present disclosure is to be considered as an exemplification of the invention, and is not intended to limit the invention to the specific embodiments illustrated by the figures or description below.

Reference will now be made in detail to the present embodiments of the disclosure, certain examples of which are illustrated in the accompanying drawings.

Figure 1:
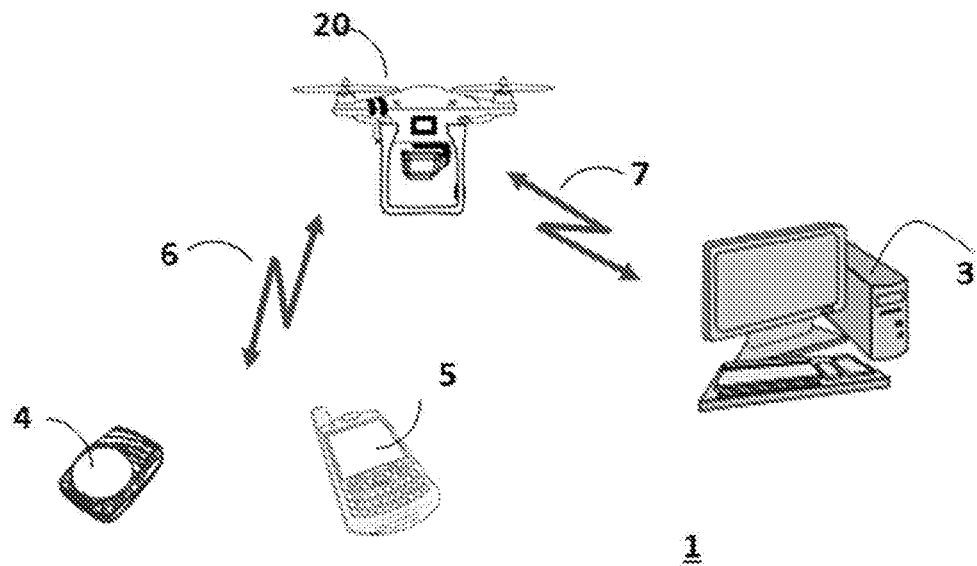
FIG. 1 is a diagram illustrating an exemplary system that may be used to implement certain aspects of the disclosed embodiments.

FIG. 1 is a diagram illustrating an exemplary system 1 that may be used to implement certain aspects of the disclosed embodiments. The type, number, and arrangement of devices, components, and elements illustrated in FIG. 1 may vary consistent with the disclosed embodiments.

In one embodiment, system 1 may comprise at least one unmanned aerial vehicle 2, at least one mobile device, which for example may be a smartphone 5, an active RFID tag 4 or any other mobile device with wireless communication capabilities. According to this embodiment, the unmanned aerial vehicle (UAV) 2 may have means for performing wireless communication 6 with the mobile devices 4-5.

The unmanned aerial vehicle 2 maybe a unit that uses aerodynamic forces to provide vehicle lift, can fly autonomously or be piloted remotely. The UAV 20 may carry different kind of payloads including wireless communication means 6 with mobile devices 4-5, means for measuring wireless signals (e.g. RSS, AoA, TOA, etc.), imaging means (e.g. video camera, IR camera, still image camera, etc.), a 2-axis or 3-axis gimbal for maintaining the stability of the imaging means and/or allow pointing the imaging means in a certain direction (i.e. azimuth) and elevation angle, illumination means (e.g. electronic flash) to illuminate a certain area and audio means which may comprise a microphone to capture audio signals and/or a speaker to reproduce audio signals. The UAV 20 may fly autonomously in accordance to a programmed flight path and/or as piloted remotely by a computer 3 (e.g. in a base station) or by a person. The UAV 20 may have flight autonomy of minutes to hours.

According to one embodiment, the RFID tag 4 may be a small portable unit able to transmit wireless signals at periodic intervals and/or as a response to a certain trigger (e.g. received wireless signal, received IR/ultrasound signal, motion above and/or below certain threshold, internal timer, data from a sensor, etc.). The RFID tag 4 may comprise different sensors including temperature/humidity sensor, pressure sensor, gas sensor, accelerometer, hall switch, 3D magnetometer and/or GPS.

The RFID tag 4 may be able to perform two-way ranging (TWR) with another unit by exchanging wireless signals and measuring the Time of Arrival (TOA) and measuring or setting the Time of Transmission (TOT). The RFID tag may comprise different means for wireless communication 6. In one embodiment, the RFID tag 4 may be carried by persons, and/or attached to animals and/or attached to assets.

In other embodiments, assets (not shown) may be configured with components that enable and activate RFID tag 4. For instance, different asset types may comprise computing components that can program different measurement and/or telemetry parameters in the RFID tag 4 affixed to the asset. For instance, an asset may comprise a device that stores program information for RFID tag 4.

The wireless communication 6 between the UAV 20 and the mobile devices 4-5 may be either unidirectional, from the mobile devices 4-5 to the UAV 20 or bidirectional, and in accordance to one or more wireless communication technologies including IEEE802.11a/b/g/n/ac/ad, IEEE802.15.4, IEEE802.15.4a, Bluetooth 4.0/5.0, Wireless HART, NB-IoT, LTE Cat0 for M2M, LTE-M Rel. Cat-0, Cat-1 and Cat-4, LoRaWAN™, Low Power Wide Area Network (LPWAN), SIGFOX, Weightless-N, Weightless-P, Weightless-W, Z-Wave, Low frequency near field, or any other known wireless network that facilitates wireless communications between elements.

According to certain aspects of the disclosed embodiments, the mobile devices 4-5 and/or the UAV 20 may use CSMA/MA and/or TDMA techniques to avoid the collision of wireless signals transmitted by different units.

Also according to this embodiment as depicted FIG. 1, the system 1 may comprise a computer 3 (e.g. computer equipment like a laptop, mobile device (e.g., smart phone, tablet), desktop computer, server, gateway, computer rack equipment, etc.) which is physically separated from the UAV 20 and which may have wireless communication 7 with the UAV 20. Typically this may be a bidirectional communication link in accordance to one or more wireless communication technologies including IEEE802.11a/b/g/n/ac/ad, IEEE802.15.4, IEEE802.15.4a, Bluetooth, Wireless HART, NB-IoT, LTE Cat0 for M2M, LTE-M Rel. Cat-0, Cat-1 and Cat-4, Weightless-N, Weightless-P, Weightless-W, 3G and 4G cellular, satellite communication, proprietary technologies, or any other known wireless network that facilitates wireless communications between elements.

Communication 7 may comprise any infrastructure that is used to facilitate communications with computer 3, such as communication links, wireless towers, routers, gateways, or other similar means.

According to one embodiment, the computer 3 may be used for one or more of the following tasks among others:
  Remote piloting of the UAV 20
  Sending data, audio, video and/or commands to the UAV 20, wherein part of this information may be retransmitted to the mobile device 4-5.
  Receiving data, audio, video and status from the mobile device 4-5 relayed by the UAV 20.
  Controlling the imaging means in the UAV 20 and receiving images
  Controlling the wireless signal measurement means in the UAV 20
  Getting commands from a user for any of the tasks above
  Displaying and/or reporting to the user UAV 20 and/or mobile device 4-5 telemetry, status, measurements, flight, location and any other useful related information.
  Communicating with another computer to exchange UAV 20 and/or mobile device 4-5 control, telemetry, status, measurements, flight, location and any other useful related information.

Computer 3 may be one or more one or more computers configured to execute software to perform one or more processes, such as sending and/or receiving information over a network, processing information, and/or producing results of processed data. Computer 3 may also be configured to execute software that performs one or more processes consistent with the disclosed embodiments.

Computer 3 may also comprise one or more memory devices that store software and/or program instructions that, when executed by the one or more processors of computer 3, perform one or more processes consistent with aspects of the disclosure. Computer 3 may comprise other known computing components for performing known computing functions, such as executing software, storing and accessing information from memory, processing information, and generating and sending information and receiving over a communication link (e.g., communication links 7).

Computer 3 may also operate as a server which may have connected clients (not shown in FIG. 1). For example, client(s) may comprise a general purpose or notebook computer, a mobile device with computing ability, a server, a desktop computer, tablet, or any combination of these computers and/or affiliated components. Client(s) may be configured with one or more processors and one or more memory devices that store data and software instructions that are executable by the one or more processors. Client(s) may also comprise communication software that, when executed by a processor, provides communications with communication link 7, such as Web browser software, tablet or smart hand held device networking software, or other similar software applications.

The wireless communication link 6 between the UAV 20 and the mobile devices 4-5 may be used for different purposes including:
  Measurement of a representative parameter of a wireless signal transmitted by the mobile device 4-5 (e.g. RSS, TOA, AoA, etc.).
  Measurement of Round Trip Time of wireless signals exchanged between the UAV 20 and the mobile devices 4-5
  Sending data and commands from the UAV 20 to the mobile device 4-5. The data and commands may comprise:
    Configuration data to the mobile devices 4-5
    SW/FW data to the mobile devices 4-5 (e.g. download of a new SW and/or FW to the mobile devices)
    Commands to start/end performing measurements
    Commands to activate and/or deactivate functions in the mobile devices 4-5
    Video and/or audio
  Sending telemetry data from the mobile devices 4-5 to the UAV 20. The telemetry data may comprise:
    Mobile device ID (e.g. MAC address)
    Measurement request
    Mobile device status
    Data from sensors attached and/or in communication with the mobile devices 4-5. May include information related to motion, temperature, pressure, humidity, battery voltage, pushbuttons.
    Video and/or audio
    GPS data In one aspect of system 1, the UAV 20 may comprise multiple means for wireless communication 6 with the mobile devices 4-5. For example it may comprise an UWB link in accordance with WEE802.15.4a to communicate with RFID tags 4 which support this UWB link and in addition a Wi-Fi link in accordance with IEEE802.11n to communicate with smartphones 5 or other suitable mobile devices. In other aspect, the UAV 20 may use multiple means of wireless communication 6 to communicate with the same mobile device 4-5.

In one aspect of system 1, the UAV 20 may use the wireless communication 6 to communicate with other UAV's flying in communication range with UAV 20.

One skilled in the art will appreciate that the UAV 20 may use a single wireless communication means to communicate with a plurality of mobile devices 4-5 and/or UAV's which support that wireless communication.

Also according to this embodiment, the wireless communication link 7 between the UAV 20 and the computer 3 may be used for different purposes including:
  Controlling the flight of the UAV 20
  Receiving information from the UAV 20 related to its flight
  Controlling UAV 20 functions as imaging units, sensors, wireless links, etc.
  Receiving from the UAV 20 imaging data, sensor data, etc.
  Controlling in the UAV 20 the measurements and other activities to be performed with mobile devices 4-5 and with other UAV's which may be in the same area and in communication range.
  Receiving from the UAV 20 data resulting from measurements (e.g. RSS, TWR, SDS-TWR, etc.) with mobile devices 4-5 and any other data related and/or associated with these measurements (e.g. time stamps, GPS data, mobile device ID, mobile device telemetry, images, video data, etc.).

Figure 2:
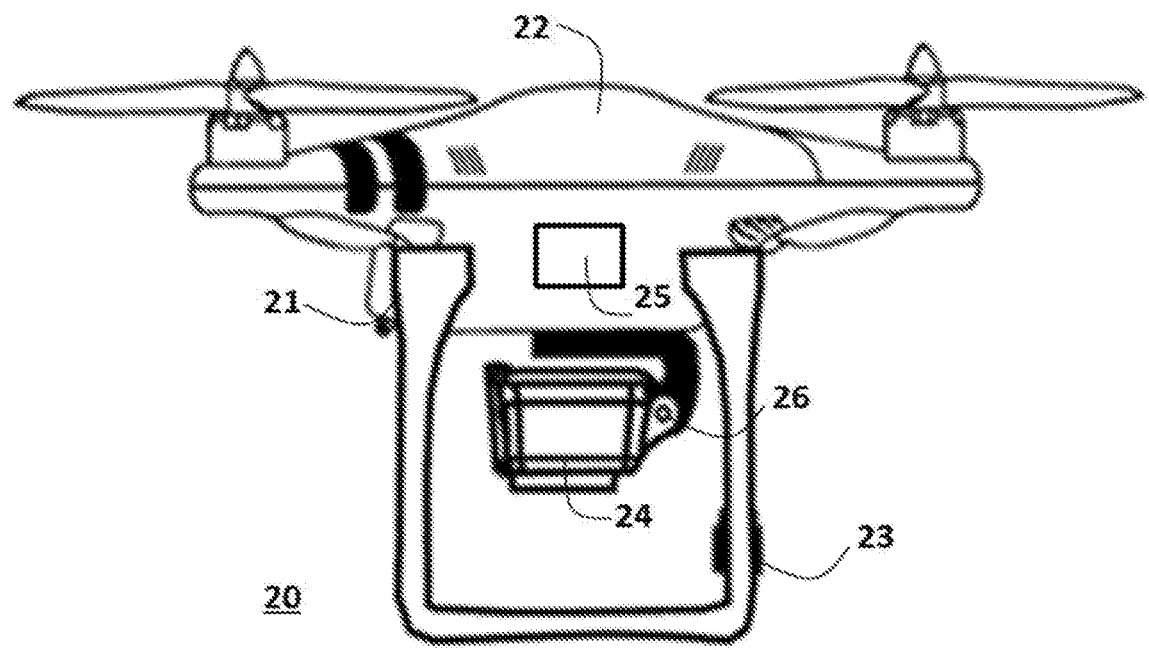
FIG. 2 is a diagram illustrating an exemplary unmanned aerial vehicle (UAV) with an affixed wireless module and other modules consistent with certain disclosed embodiments.

Sending data and commands from the computer 3 to the UAV 20 to be further transmitted by the UAV 20 to the mobile devices 4-5. The data and commands may comprise:
Configuration data to the mobile devices 4-5
SW/FW data to the mobile devices 4-5 (e.g. download of a new SW and/or FW to the mobile devices)
Commands to start/end performing measurements
Commands to activate and/or deactivate functions in the mobile devices 4-5
Video and/or audio
Receiving from the UAV 20 telemetry data sent to it by the mobile devices 4-5. The telemetry data may comprise:
Mobile device ID (e.g. MAC address)
Mobile device status
Data from sensors attached and/or in communication with the mobile devices 4-5. May include information related to motion, temperature, pressure, humidity, etc.
Video and/or audio
GPS data The disclosed embodiments may use the wireless communication links 6-7 to communicate with other functions not shown in FIG. 1 as follows:
Other UAV's in communication range
Satellites
Aircrafts and/or ships
Ground vehicles FIG. 2 shows a diagram illustrating an exemplary unmanned aerial vehicle (UAV) 20 that may be used to implement certain aspects of the disclosed embodiments. For the sake of simplicity, the diagram only shows certain functions and modules which may be relevant to the implementation of certain aspects of the disclosed embodiments.

In one embodiment, UAV 20 maybe a unit that uses aerodynamic forces to provide vehicle lift, can fly autonomously or be piloted remotely. According to one embodiment, the UAV 20 comprises a main body 21 with landing arms and propellers. The UAV body 21 may comprise in its upper part 22, a battery for driving the propellers and other UAV 20 functions, an on-board computer for controlling the UAV 20 and its functions, a GPS receiver with GPS antenna to support navigation and location functions of the UAV 20 and flight control and sensors. The UAV 20 may also comprise a compass 23 to support UAV orientation.

The UAV 20 may carry different kind of payloads including wireless communication means 25 with mobile devices, means for measuring wireless signals (e.g. RSS, AoA, TOA, etc.), imaging means 24 (e.g. video camera, IR camera, still image camera, etc.), a 2-axis or 3-axis gimbal 26 for maintaining the stability of the imaging means and/or allow pointing the imaging means in certain direction (i.e. azimuth) and elevation angle, illumination means (e.g. electronic flash) to illuminate a certain area (not shown in FIG. 2), audio means which may comprise a microphone to capture audio signals and/or a speaker to reproduce audio signals (not shown in FIG. 2), etc.

The UAV 20 may fly autonomously in accordance to a programmed flight path and/or as piloted remotely by a computer 3 (e.g. in a base station) or by a person. The UAV 20 may have flight autonomy of minutes to hours according to its battery capacity, payload and other UAV properties.

In one embodiment, the wireless communication means 25 may perform wireless communication with mobile devices 4-5 and perform measurements which may support estimating the location of these mobile devices 4-5 in a certain area.

Figure 3:
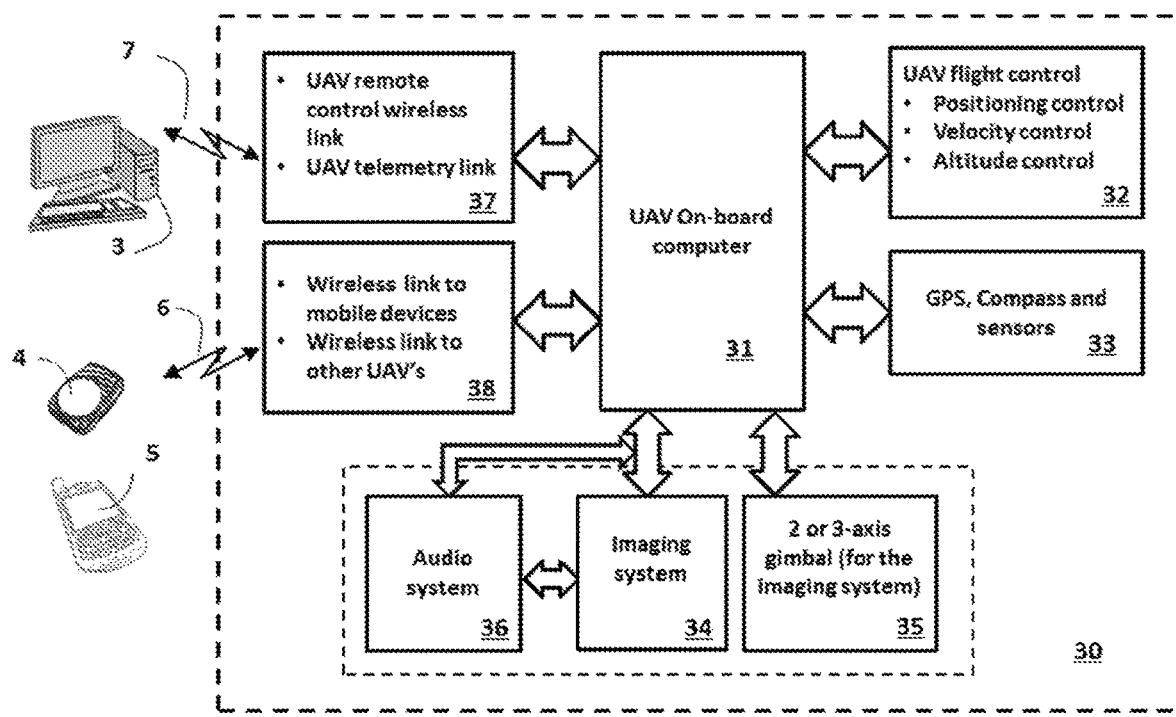
FIG. 3 is a block diagram illustrating exemplary functions comprised in an unmanned aerial vehicle consistent with disclosed embodiments.

FIG. 3 is a block diagram illustrating exemplary functions 30 comprised in an unmanned aerial vehicle 20 consistent with disclosed embodiments.

In one embodiment, the unmanned aerial vehicle 20 comprises an on-board computer 31 which may be used to control and monitor UAV 20 functions consistent with disclosed embodiments. The on-board computer 31 may be a low-power high performance processor (e.g. ARM® Cortex®-M4 32b) able to perform the required tasks. The on board computer 31 may comprise memory to store instructions and data (e.g. program parameters, measurement results, system configuration, system identification, video and audio files, etc.). The memory may comprise random access memory (RAM), flash memory, ROM, SDRAM, DRAM, and the like.

The on-board computer 31 may also comprise interfaces to communicate with other functions and modules 32-38 in the UAV 20. In certain aspects, the onboard computer 31 may interface with a UAV flight control unit 32 which may comprise UAV positioning control, velocity control and altitude control. The UAV flight control unit 32 provides the control and driving signals to let the UAV 20 take-off, fly and land.

In accordance to certain embodiments, the UAV on-board computer 31 may interface with a navigation unit 33 comprising GPS, compass and sensors. This unit 33 may provide the information to let the UAV 20 fly in accordance to a certain path and/or certain positioning commands.

In accordance with certain embodiments, the on-board computer 31 may interface with an imaging system 34 which may be installed in the UAV 20. According to certain aspects, the imaging system 34 may comprise a digital video camera (e.g. HD, 3D, etc.) able to capture standard video images, IR images, video and audio, etc. and/or a still-image digital camera able to capture a single or sequence of still images. The imaging system 34 may support zooming-in and out the cameras, controlling the shutter speed and aperture, sensor sensitivity (ISO speed), image resolution, video standard and other parameters as commonly found in digital photography.

The imaging system 34 may also comprise a flash light system to illuminate the target scene in certain light conditions (e.g. during night). According to certain aspects, the imaging system 34 may provide on-image information comprising GPS coordinates of the image center, image scale, mobile device 4-5 information, date and time, markers, etc. The imaging system 34 may also comprise memory to store the images. The on-board computer 31 may control and monitor each of the imaging system 34 functions and transfer data (e.g. video, still images) from the imaging system to the computer 31.

In certain aspects of the disclosed embodiments, the imaging system 34 may be assembled on a 2 or 3-axis gimbal 35 to provide stability to the imaging system while flying and/or allow pointing the imaging system 34 to a certain target (e.g. a certain mobile device 4-5). The gimbal system 35 may be controlled and monitored by the on-board computer 31.

In certain aspects of the disclosed embodiments, the UAV 20 may comprise an audio system 36. The audio system may be controlled and monitored by the on-board computer 31 or by the imaging system 34 when the video information is combined with audio information.

The audio system 36 may comprise a microphone to receive audio signals, a speaker to reproduce audio signals, a codec (i.e. coder/decoder) to encode audio signals from the microphone into a digital audio stream or to convert a digital audio stream into an analog audio signal, an audio amplifier to amplify microphone signals and/or to drive a speaker and storage means to store audio data streams. When combined with captured video data, the encoded audio data stream or the analog audio signals may be directly provided to the imaging system 34.

In certain aspects of the disclosed embodiments, the UAV 20 may comprise wireless communication means 37 with a computer 3 (e.g. computer equipment like a laptop, mobile device (e.g., smart phone, tablet, etc.), desktop computer, server, gateway, computer rack equipment, etc.) which is physically separated from the UAV 20. In certain aspects of the disclosed embodiments this may be a bidirectional communication link in accordance to one or more wireless communication technologies including IEEE802.11a/b/g/n/ac/ad, IEEE802.15.4, IEEE802.15.4a, Bluetooth, Wireless HART, NB-IoT, LTE Cat0 for M2M, LTE-M Rel. Cat-0, Cat-1 and Cat-4, Weightless-N, Weightless-P, Weightless-W, 3G and 4G cellular, satellite communication, proprietary technologies, or any other known wireless network that facilitates wireless communications between elements.

According to certain embodiments, the wireless communication means 37 may be used for one or more purposes including:

Controlling the flight of the UAV 20
Receiving information from the UAV 20 related to its flight
Controlling UAV 20 functions as imaging units, sensors, wireless links, etc.
Receiving from the UAV 20 imaging data, sensor data, etc.
Controlling in the UAV 20 the measurements and other activities to be performed with mobile devices 4-5 and with other UAV's which may be in the same area and in communication range.
Receiving from the UAV 20 data resulting from measurements (e.g. RSS, TWR, SDS-TWR, etc.) with mobile devices 4-5 and any other data related and/or associated with these measurements (e.g. time stamps, GPS data, mobile device ID, mobile device telemetry, images, video data, etc.).
Sending data and commands from the computer 3 to the UAV 20 to be further transmitted by the UAV 20 to the mobile devices 4-5. The data and commands may comprise:
Configuration data to the mobile devices 4-5
SW/FW data to the mobile devices 4-5 (e.g. download of a new SW and/or FW to the mobile devices)
Commands to start/end performing measurements
Commands to activate and/or deactivate functions in the mobile devices 4-5
Video and/or audio
Receiving from the UAV 20 telemetry data sent to it by the mobile devices 4-5. The telemetry data may comprise:
Mobile device ID (e.g. MAC address)
Mobile device status
Data from sensors attached and/or in communication with the mobile devices 4-5. May include information related to motion, temperature, pressure, humidity, etc.
Video and/or audio
GPS data In certain aspects of the disclosed embodiments, the UAV 20 may comprise wireless communication means 38 to communicate 6 with mobile devices 4-5 and/or other UAV's.

According to one aspect, the communication means 38 may support either unidirectional, from the mobile devices 4-5 to the UAV 20 or bidirectional communication, and in accordance to one or more wireless communication technologies including IEEE802.11a/b/g/n/ac/ad, IEEE802.15.4, IEEE802.15.4a, Bluetooth 4.0/5.0, Wireless HART, NB-IoT, LTE Cat0 for M2M, LTE-M Rel. Cat-0, Cat-1 and Cat-4, LoRaWAN™, Low Power Wide Area Network (LPWAN), SIGFOX, Weightless-N, Weightless-P, Weightless-W, Z-Wave, Low frequency near field, or any other known wireless network that facilitates wireless communications between elements.

According to certain embodiments, the wireless communication means 38 may be used for different purposes including:

Measurement of a representative parameter of a wireless signal transmitted by the mobile device 4-5 (e.g. RSS, TOA, AoA, etc.).
Measurement of Round Trip Time of wireless signals exchanged between the UAV 20 and the mobile devices 4-5
Sending data and commands from the UAV 20 to the mobile device 4-5. The data and commands may comprise:
Configuration data to the mobile devices 4-5
SW/FW data to the mobile devices 4-5 (e.g. download of a new SW and/or FW to the mobile devices)
Commands to start/end performing measurements
Commands to activate and/or deactivate functions in the mobile devices 4-5
Video and/or audio
Sending telemetry data from the mobile devices 4-5 to the UAV 20. The telemetry data may comprise:
Mobile device ID (e.g. MAC address)
Measurement request
Mobile device status
Data from sensors attached and/or in communication with the mobile devices 4-5. May include information related to motion, temperature, pressure, humidity, etc.
Video and/or audio
GPS data
Communicate with other UAV's flying in communication range.

In certain aspects of the disclosed embodiments, the wireless communication means 38 may support multiple types of wireless communication 6 with the mobile devices 4-5 and other UAV's. For example, wireless communication means 38 may comprise an UWB link in accordance with IEEE802.15.4a to communicate with RFID tags 4 which support this UWB link and in addition a Wi-Fi link in accordance with WEE802.11n to communicate with smartphones 5 or other suitable mobile devices. In other aspect, the UAV 20 may use multiple means of wireless communication 6 to communicate with the same mobile device 4-5.

In certain aspects of the disclosed embodiments the wireless communication means 38 may be used to communicate 6 with a plurality of mobile devices 4-5 and/or other UAV's which support that wireless communication.

In certain embodiments, UAV 20 may comprise other asset modules and/or functions 30. Module(s)/function(s) 30 may comprise one or more chips and/or circuits configured to perform one or more processes consistent with the disclosed embodiments. Module(s)/function(s) 30 may comprise software processes that are executed by one or more processors to perform one or more processes consistent with the disclosed embodiments. Further, in certain aspects, module(s)/function(s) 30 may be configured to perform processes associated with the type of UAV's 20.

Figure 4:
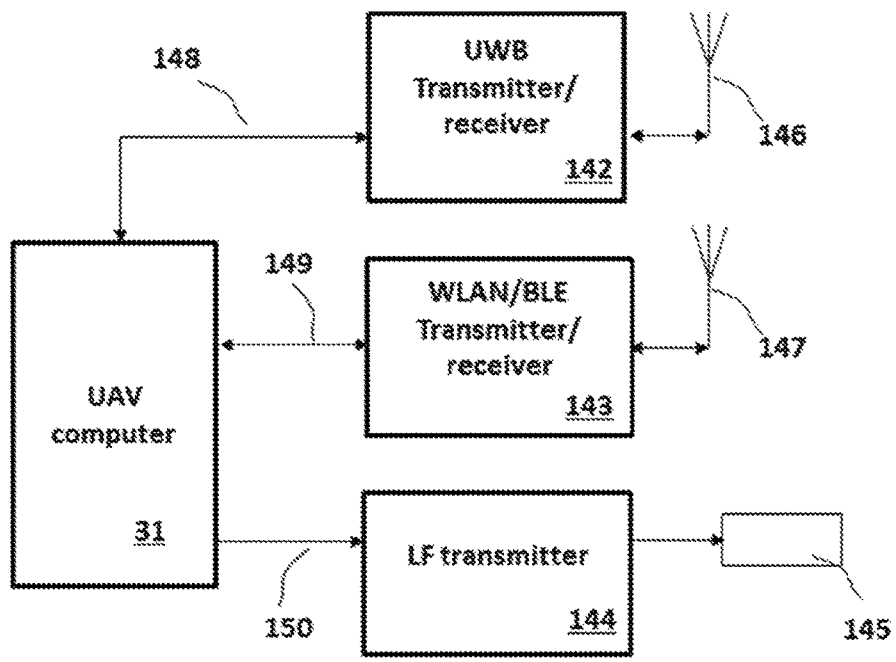
FIG. 4 is a block diagram illustrating exemplary functions used for wireless communication comprised in an unmanned aerial vehicle consistent with disclosed embodiments.

Now referring to FIG. 4, a block diagram illustrating exemplary functions 140 comprised in an unmanned aerial vehicle 20 consistent with disclosed embodiments is depicted.

According to one embodiment, the unmanned aerial vehicle 20 may comprise an on-board computer 31, an IEEE802.15.4a (UWB) UWB transmitter/receiver 142, a IEEE802.11a/b/g/n/ac/ad (Wi-Fi) and Bluetooth (BT) transmitter/receiver 143 which may be used to communicate and measure representative parameters of wireless signals exchanged with mobile devices 4-5 and/or other UAV's, consistent with disclosed embodiments.

In certain aspects of the disclosed embodiments, the UWB transmitter/receiver 142 may interface 148 with the on-board computer 31 and may receive an UWB message from an RFID tag 4. The UWB message may be received through the UWB antenna 146 and then may be decoded by the UWB receiver 142. The UWB message may comprise the ID of the RFID tag 4 and optionally other telemetry information. In addition to receiving the UWB message, the TOA of that message may be time stamped. Since the message may be transmitted using a very large bandwidth (e.g. greater than 500 MHz), the TOA may be measured with a high precision (e.g. less than 1 nsec). The UWB transmitter 142 may transmit to the tag 4 an UWB message. The time of transmission (TOT) of that message may be also time-stamped with a high precision. According to one embodiment, the UWB transmitter/receiver 142 may be implemented using the DecaWave DW1000 IEEE802.15.4-2011 UWB Transceiver.

In certain aspects of the disclosed embodiments, the on-board computer 31 may interface 149 with an IEEE802.11a/b/g/n/ac/ad (Wi-Fi) and Bluetooth transmitter/receiver 143. The Wi-Fi/BT transmitter/receiver 143 may comprise an RF and baseband section able to transmit and receive message in accordance with these wireless communication standards. In accordance to certain embodiments, the transmitter/receiver may be connected to an antenna 147. For the sake of simplicity, FIG. 4 depicts only one antenna 147 for the Wi-Fi/BT transmitter/receiver 143 but as may be apparent to those skilled in the art, the use of multiple-band antennas and/or multiple antennas may be required in accordance to the specific implementation of the Wi-Fi/BT transmitter/receiver 143 and the frequency bands used. According to certain embodiments, the Wi-Fi and/or BT receiver may measure the Received Signal Strength (RSS) of a received signal and report this value to the on-board computer 31. Since the RSS is inversely proportional to the distance between the transmitter (i.e. the mobile device 4-5) and the receiver 143, it may be used to estimate the position of the mobile device 4-5.

In certain aspects of the disclosed embodiments, the Wi-Fi/BT transmitter/receiver 143 may comprise means to measure the Angle of Arrival (AoA) of received signals. This may be accomplished by using a suitable antenna (e.g. phase array antenna). The AoA of a received signal (e.g. transmitted by a mobile device 4-5) may be used to further estimate its position.

According to one embodiment, the unmanned aerial vehicle 20 may comprise a Low Frequency (LF) transmitter 144 interfaced 150 to the on-board computer 31. The LF transmitter 144 may be a near-field magnetic transmitter operating in a low frequency (e.g. 125 KHz). In certain aspects of the disclosed embodiments, the LF transmitter 144 may transmit through the LF antenna 145 (e.g. a coil antenna with a ferrite core) messages which may be received by mobile devices (e.g. RFID tag 4). In certain aspects of the disclosed embodiments, the messages transmitted by the LF transmitter 144 may trigger RFID tags 4 that received the LF message to start an operation (e.g. activate the tag, transmit signals, change its configuration, etc.). Since the effective range of the LF link may be limited to 6-10 m (e.g. due to the antenna size, transmission power, etc.) it can also be used as a proximity detector. Thus, RFID tags 4 which received an LF message may transmit a response (e.g. using a Wi-Fi message) wherein the response may be used as a confirmation of proximity between the UAV 20 and the RFID tag 4.

Figure 5:
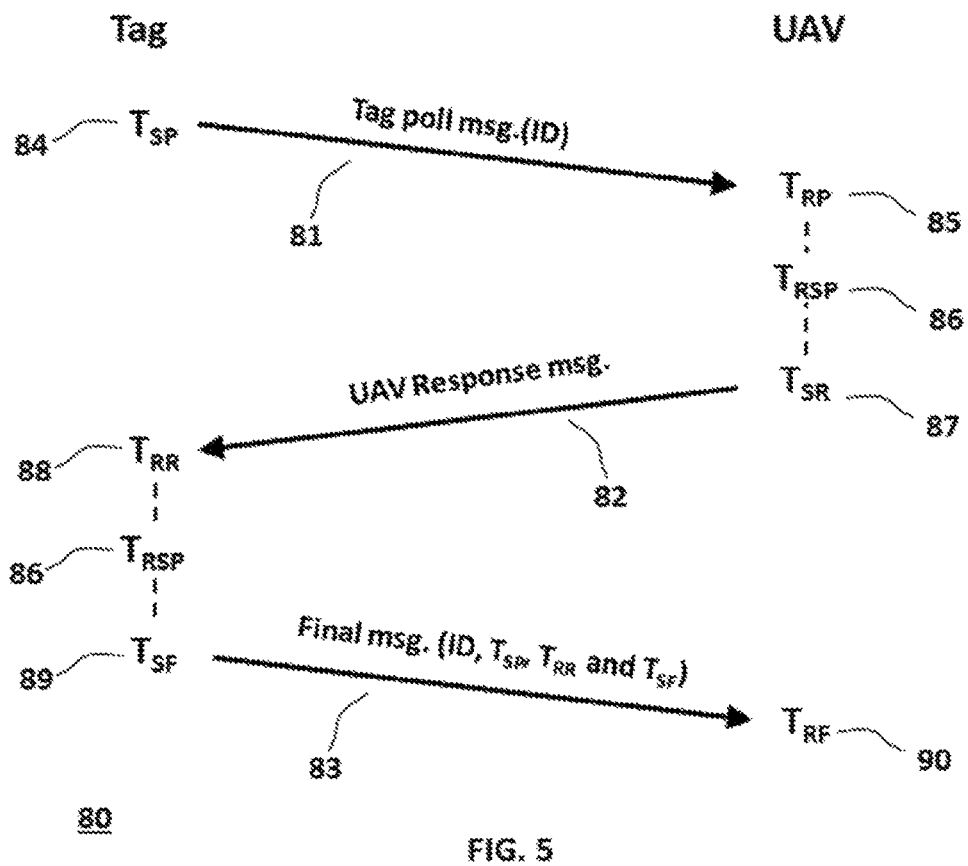
FIG. 5 is a timing diagram illustrating an exemplary sequence of messages exchanged between a UAV and an RFID tag to perform a Round Trip Time measurement consistent with disclosed embodiments.

Now referring to FIG. 5, a timing diagram illustrating an exemplary process of a symmetrical double sided-two-way ranging (SDS-TWR) 80 consistent with disclosed embodiments is depicted.

According to one embodiment, an RFID tag 4 may initiate a symmetrical double sided-two-way ranging (SDS-TWR) 80 by transmitting a Poll message 81. The Poll message 81 may be transmitted in accordance to IEEE802.15.4a (UWB). Also according to this embodiment, the RFID tag 4 may time-stamp the transmission 84 of the Poll message ($T_{SP}$). The Poll message 81 may comprise the ID of the RFID tag 4 and other information. The transmitted Poll message 81 may be received 85 after some delay (i.e. due to the propagation time) by the UWB receiver 142 in the UAV 20. The UWB receiver 142 may time stamp the reception 85 of the Poll message at time $T_{RP}$.

As a response to the received Poll message 81 from the tag 4, the UAV UWB transmitter 142 may transmit back to the tag 4 a UAV response message 82 after $T_{RSP}$ 86 time. The time of transmission 87 of the response message ($T_{SR}=T_{RP}+T_{RSP}$) may be time-stamped with a high precision.

When the tag 4 receives 88 the UAV response message 82 from the UAV 20, it may time-stamp its TOA ($T_{RR}$) and then transmit after $T_{RSP}$ 86 time, a final response message at time $T_{SF}$ 89 ($T_{SF}=T_{RR}+T_{RSP}$), wherein the message comprises the tag 4 ID, and the values of $T_{SP}$, $T_{RR}$ and $T_{SF}$.

The final response message 83 from the tag 4 may be received 90 by the UAV 20 UWB receiver 142, and its TOA ($T_{RF}$) may be time-stamped.

According to certain aspects of the disclosed embodiments, the RFID tag 4 ID and the measured values $T_{SP}$, $T_{RP}$, $T_{SR}$, $T_{RR}$, $T_{SF}$ and $T_{RF}$ may be transferred to the on-board computer 31. Also according to certain aspects of the disclosed embodiments, the on-board computer 31 may calculate the distance of the UAV 20 to the RFID tag 4, according to appropriate formulas, including for example:

$$\text{Distance[UAV-RFID tag]}=c\times[(2T_{RR}-T_{SP}-2T_{SR}+T_{RP}+T_{RF}-T_{SF})/4]$$

Where c=Speed of light

As may be apparent to those skilled in the art, the calculation of the distance between the UAV 20 and the RFID tag 4 is not affected by the relative drift and offset between the clocks (i.e. used for time stamping) in both units. This is an advantage of the symmetrical double sided-two-way ranging (SDS-TWR) 80 wherein the interval $T_{RSP}$ is the same in both units. Since the SDS-TWR 80 may be performed while the UAV 20 and/or the RFID tag 4 are moving, the two-way ranging process 80 should be performed ain a short time to minimize measurement errors. An overall SDS-TWR 80 time of few msec (e.g. <5 msec) may be acceptable assuming either the UAV 20 and/or the RFID tag 4 are not moving at relative velocities higher than 30 msec.

In certain embodiments, the two-way ranging may not be fully symmetrical and the response intervals at both sides are different. In that case, estimating the clock deviation between both units is required to minimize the ranging error.

The clock deviation may be estimated among other ways as follows:

$$TCK_{dev}=(T_{RF}-T_{RP})/(T_{SF}-T_{SP})$$

In certain embodiments, the distance between the UAV 20 and the RFID tag 4 may be calculated by a separate computer 3, following the transfer of the RFID tag 4 ID and the measured values $T_{SP}$, $T_{RP}$, $T_{SR}$, $T_{RR}$, $T_{SF}$ and $T_{RF}$ from the on-board computer 31 to the separate computer 3.

According to certain embodiments, the RFID tags 4 may only transmit messages and therefore performing two-way ranging is not possible or not desired.

Figure 6:
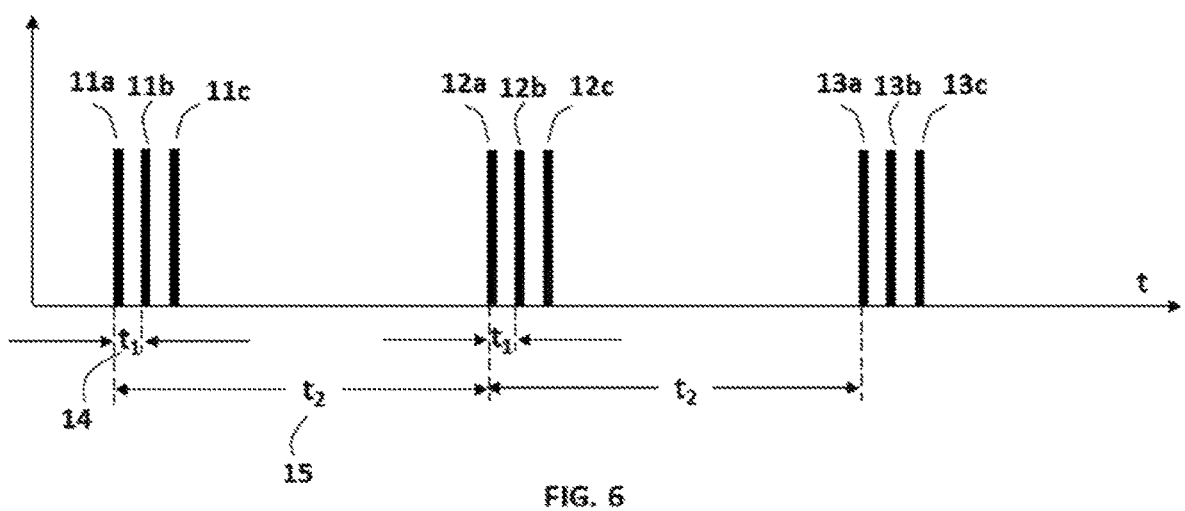
FIG. 6 is a timing diagram illustrating an exemplary sequence of messages transmitted by mobile devices consistent with disclosed embodiments.

Now referring to FIG. 6 a method of performing TDOA measurements by a single UAV 20 of signals transmitted by a mobile device (e.g. RFID tag 4) is disclosed consistent with disclosed embodiments.

According to certain embodiments, an RFID tag 4 may transmit messages in accordance with IEEE802.15.4a. The messages may be transmitted in groups (i.e. bursts) of 2-3 messages with short intervals between the messages. As depicted in FIG. 6, the group of three messages 11*a*-11*c* may be transmitted by the RFID tag 4 with $t_1$ 14 intervals. The groups of messages 12*a*-12*c* and 13*a*-13*c* may be transmitted by the tag 4 in a similar manner. According to this embodiment, the interval between the groups of messages (i.e. the interval between message 11*a* and 12*a* or 12*a* and 13*a*) is $t_2$ wherein $t_2$ 15 is much longer than $t_1$ 14.

According to certain aspects of the disclosed embodiments, $t_1$ 14 may be in the order of several hundred usec (e.g. 0.5-1 msec) and $t_2$ 15 in the order of few tens to hundreds of msec (e.g. 50-200 msec).

According to certain embodiments, a UAV 20 with an UWB receiver 142 and UWB antenna 146 flying in communication range with an RFID tag 4 transmitting group of pulses as described in FIG. 6, may receive and time stamp messages transmitted by the tag 4.

Since the interval $t_1$ 14 is short (e.g. less than 1 msec), the UAV 20 can only move a short distance assuming it is flying at typical speeds (e.g. less than 50 m/sec). Therefore, according to this embodiment it may be assumed that the UAV does not move when receiving a specific group of messages 11*a*-11*c*, 12*a*-12*c* or 13*a*-13*c*. According to certain aspects of the disclosed embodiments, the UWB receiver 142 may measure the TOA of the received messages with an accuracy of 1 nsec (e.g. standard deviation). Thus, the on-board computer 31 connected to the UWB receiver 142 may estimate the $t_1$ 14 interval with an accuracy of ~1.5 nsec (i.e. standard deviation).

According to certain aspects of the disclosed embodiments, the $t_1$ 14 and $t_2$ 15 intervals used by the RFID tag 4 to transmit the messages may be known to the on-board computer 31 or reported by the tag 4 in the transmitted messages.

According to certain aspects of the disclosed embodiments, the on-board computer 31 may calculate the difference between the measured interval $t_1$ 14 at the UWB receiver 142 (i.e. the interval is measured in accordance to the UWB receiver clock) and the same interval as defined by the tag 4 (i.e. the interval is measured in accordance to the tag clock).

Assuming that both the UAV 20 and the tag 4 are static, this difference may be caused by the offset between the UAV 20 and tag 4 clocks (e.g. for an offset of 20 ppm, the UAV 20 will measure a difference of 20 nsec for a $t_1$=1 msec interval).

As may be apparent to those skilled in the art, the on-board computer 31 may estimate the offset between the UAV 20 and the tag 4 clocks at periodic intervals (e.g. 50 msec) and then may use adaptive filters (e.g. Kalman filters) to estimate the instantaneous offset between the clocks also at times different than the groups of messages 11*a*-11*c*, 12*a*-12*c* or 13*a*-13*c*.

According to certain aspects of the disclosed embodiments, the on-board computer 31 may calculate the difference between the measured interval $t_2$ 15 at the UWB receiver 142 (i.e. the interval is measured in accordance to the UWB receiver clock) and the same interval as defined by the tag 4 (i.e. the interval is measured in accordance to the tag clock).

In contrast to the reception of a single group of messages 11*a*-11*c*, 12*a*-12*c* or 13*a*-13*c*, the reception of different groups of messages may be performed when the UAV 20 is at different positions in respect to the tag 4.

Having the behavior of the clock offset over time, the on board computer 31 may estimate the TDOA between the groups of messages, for example as follows:

$$TDOA[GM_1,GM_2]=TOA_{GM2}-TOA_{GM1}-t^*_2$$

Where:
$t^*_2$=Corrected $t_2$ interval by taking in account the accumulated clock offset during the $t_2$ interval (in accordance to the UAV clock).
$TOA_{GM1}$=TOA of Group of Messages #1 11*a*-11*c*. The TOA may be estimated as the start of the first message in the group 11*a*.
$TOA_{GM2}$=TOA of Group of Messages #2 12*a*-12*c*. The TOA may be estimated as the start of the first message in the group 12*a*.

From the description above, the on-board computer 31 may calculate the TDOA of signals transmitted by a tag 4 when the UAV 20 is at different positions in respect to the tag 4.

The on-board computer 31 may estimate the TDOA of groups of received messages when the UAV 20 is at more than two different positions in respect to the tag 4. By intersecting the hyperbolae resulting from the estimated TDOA values and the position of the UAV 20 when it received each of the groups of messages it may be possible to estimate the location of the tag 4.

As can be observed from the above description, the selection of the $t_1$ 14 and $t_2$ 15 intervals is important to achieve good location accuracy. Setting $t_1$ 14 too short (e.g. 100 usec) does not allow estimating the clock offset with a good accuracy due to the inherent precision of the TOA measurement. Setting this interval too long (e.g. 5 msec), the clock offset estimation may suffer from the UAV 20 movement. Setting $t_2$ 15 too short (e.g. 50 msec) may not allow enough movement of the UAV 20 in respect to the tag and also affects the tag 4 battery life due to the frequent transmissions. Setting the $t_2$ 15 interval too long (e.g. 5-10 sec), may increase the complexity of accurately compensating for the clock offset what will directly affect the accuracy of the calculated TDOA.

In certain embodiments, the TDOA values may be calculated by a separate computer 3, following the transfer of the relevant information (i.e. TOA values, UAV position when receiving the messages, tag ID, etc.) from the on-board computer 31 to the separate computer 3.

As may be apparent to those skilled in the art, multiple TDOA values may be estimated for a plurality of mobile devices 4-5 when the UAV 20 is flying in communication range with these mobile devices 4-5.

Figure 7:
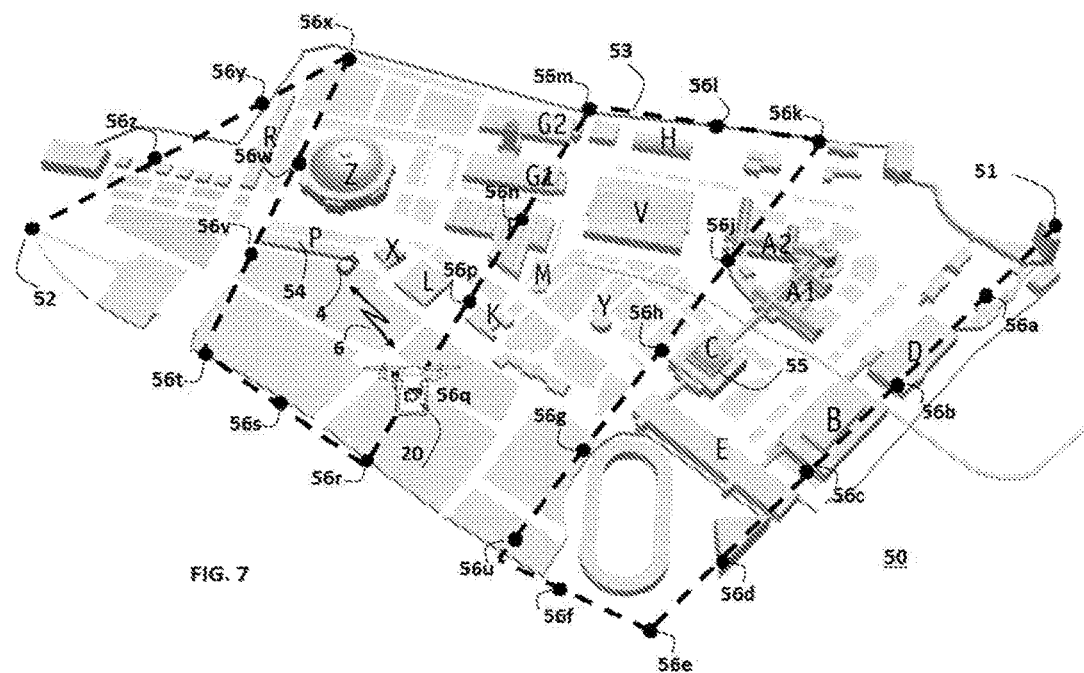
FIG. 7 is a diagram illustrating an exemplary system including an unmanned aerial device flying in an open area and a wireless tag consistent with disclosed embodiments.

Now referring to FIG. 7 a diagram illustrating an exemplary system including an unmanned aerial device 20 flying in an open area 50 and a wireless RFID tag 4 consistent with disclosed embodiments is depicted.

According to certain embodiments, an UAV 20 may be programmed to fly in a certain area 50 following a programmed flight path 53. The UAV may enter into the area 50 at a start point 51 and exit that area at an end point 52.

The area 50 may comprise buildings, stadium, roads, gardens etc. as denoted in FIG. 7 by the letters A1, A2, B-E, G1, G2, H, K, L, M, P, R, V, X, Y and Z.

The UAV 20 flying along his trail 53 may perform measurement of representative parameters related to the wireless signal 6 (e.g. Received Signal Strength-RSS, Time of Arrival (TOA), Angle of Arrival-AoA, etc.) transmitted by mobile devices 4 in the area 50 as received by the UAV 20. The measurements may be performed by the UAV 20 at certain points 56a-56z along its trail 53.

According to certain embodiments, in addition to performing the measurements at points 56a-56z, the on-board computer 31 in the UAV 20 may stamp the geographical coordinates (i.e. longitude, latitude and altitude) of its position at points 56a-56z which are associated with the respective measurements. The associated information may also comprise a time stamp at each of the points 56a-56z and the respective UAV 20 speed and direction values.

The measured values of representative parameters related to wireless signal 6 from mobile devices 4 in the area 50, the ID of the mobile device 4 for each of the measured values and the associated information as described in the previous paragraph (i.e. the geographical coordinates of the UAV 20 at points 56a-56z when wireless signals were received by the UAV 20) may be used to estimate the position of the mobile device 4 in the area 50. According to certain embodiments, the geographical position of the mobile devices 4 may be displayed on Google maps or any other commercially available set of electronic maps.

According to certain embodiments, the measurements may be done for a plurality of mobile devices and operating in accordance with a plurality of wireless technologies.

According to certain embodiments, the flying path 53, and/or the start 51 and end 52 points may be defined in accordance to one or more parameters as follows:

Flying autonomy and capabilities of the UAV 20
Density of mobile devices in certain zones of the area 50
Minimum Geometric Dilution of Precision (GDOP) in respect to the zones where mobile devices 4-5 are expected to be.
Size and obstacles in the area 50
User's priorities (e.g. mobile devices that need to be located first)

According to certain aspects of the disclosed embodiments, the mobile devices 4-5 may be preprogrammed to transmit signals during a defined period of time (e.g. a specific hour during a day, or an interval of 10 min every hour, etc.), wherein the UAV 20 may be programmed to be present in the area 50 to receive those wireless signals and then perform measurements of their representative parameters (e.g. RSS, TOA, etc.).

According to other aspects of the disclosed embodiments, when the UAV 20 is flying in the area 50, it may transmit beacon signals which may trigger the mobile devices 4-5 to transmit signals during a defined period of time. For example, the UAV 20 may transmit beacons (e.g. BT 4.0-BLE) which may also comprise information such as which mobile devices (e.g. may comprise a group of MAC addresses) 4-5 need to start transmitting wireless signals, or perform two-way ranging, how much time the mobile devices 4-5 should stay awake for measurements, how many measurements they should perform and at what intervals, time interval for the next wake-up beacon or a sign for the end of the measurements, type of measurements to be performed (e.g. RSS, UWB two-way ranging, etc.), etc.

According to certain embodiments, the mobile devices 4-5 may receive 6 the beacons transmitted by the UAV 20 and may measure a representative parameter (e.g. RSS, TOA, etc.) related to the wireless beacons transmitted by the UAV 20. The measurements and device information from each mobile device 4-5 may be relayed to a computer 3 which using the UAV 20 flight information may compute the location of the mobile devices 4-5.

According to certain embodiments, the mobile devices 4-5 may transmit 6 to the UAV 20 its motion information and based on that the measurement intervals may be defined (e.g. differently for each mobile device). According to other aspects of the disclosed embodiments, a mobile device 4-5 may transmit 20-30 wireless signals 6 once every few hours and operate several years powered by a small battery. According to another aspect of the disclosed embodiments, an RFID tag 4 may comprise a rechargeable battery charged by a solar cell and/or by other methods (e.g. charger).

Figure 8:
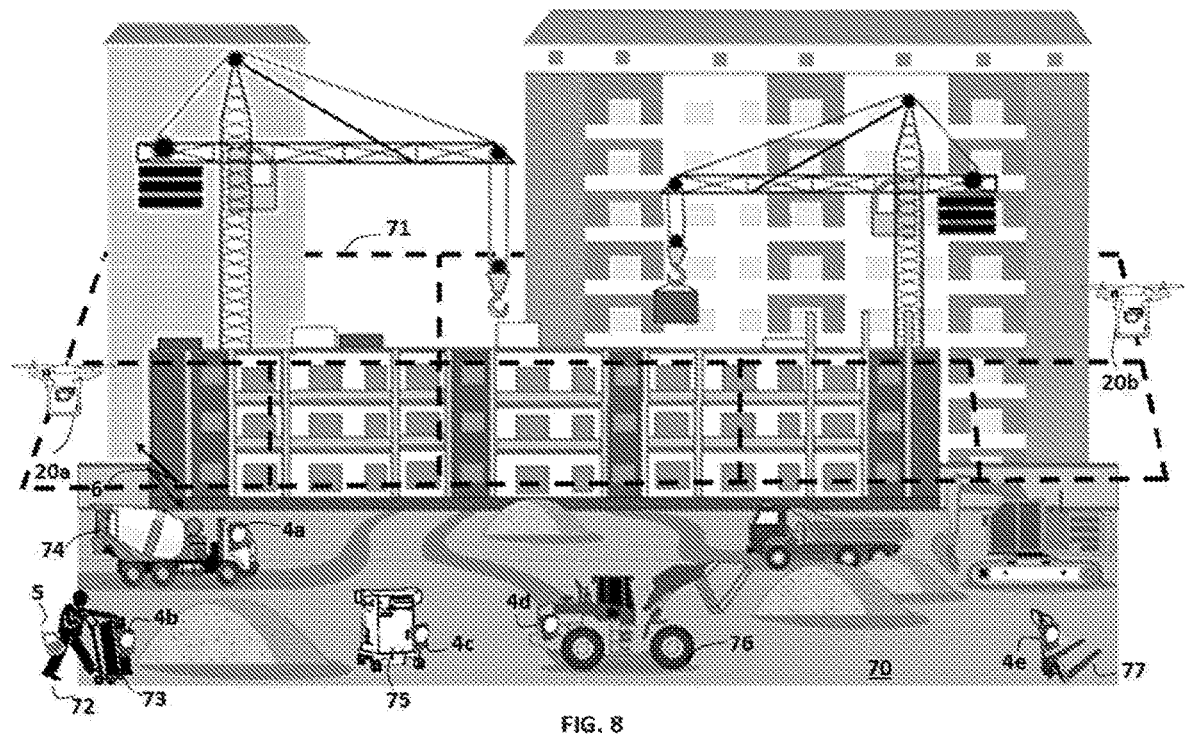
FIG. 8 is a diagram illustrating an exemplary system including unmanned aerial devices flying in a construction area and several mobile devices consistent with disclosed embodiments.

FIG. 8 is a diagram illustrating an exemplary system including unmanned aerial devices 20a-20b flying in a construction area 70 and several mobile devices 4a-4e, 5 consistent with disclosed embodiments.

According to certain aspects of the disclosed embodiments, two UAV's 20a-20b may fly in a construction area 70 and may be in wireless communication 6 range with mobile devices 4a-4e, 5 in the area 70. The UAV's 20a-20b may fly along a path 71 which may be designed to optimally cover the construction area 70.

According to certain aspects of the disclosed embodiments, the mobile devices 4a-4e, 5 may be attached to assets (i.e. tags 4a-4e) or carried by persons (i.e. smartphone 5).

According to certain aspects of the disclosed embodiments, the UAV's 20a-20b may be programmed to fly at different heights and/or in different patterns.

Figure 9:
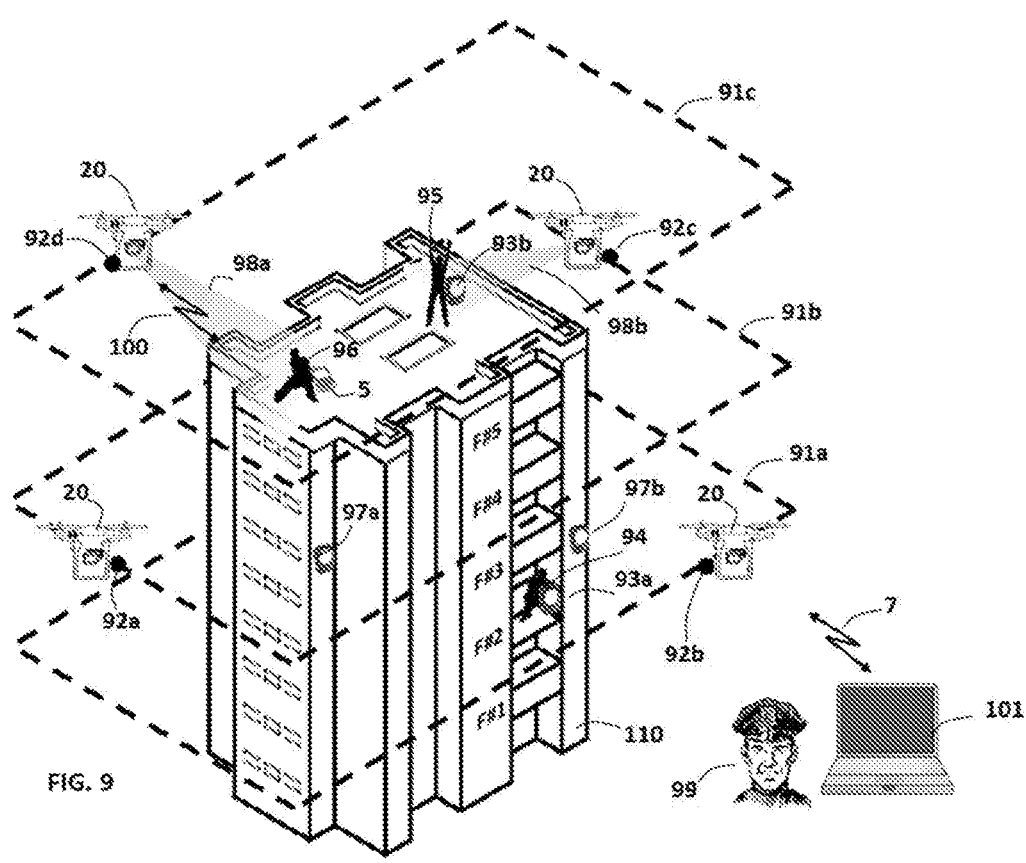
FIG. 9 is a diagram illustrating an exemplary system including an unmanned aerial device flying around a multi-floor building and several mobile devices carried by persons and tags affixed on the building consistent with disclosed embodiments.

Referring now to FIG. 9, a diagram of an exemplary system including an unmanned aerial device 20 flying around a multi-floor building 110 and several mobile devices 93a-93b, 5 carried by persons and RFID tags 97a-97b affixed to the building consistent with disclosed embodiments is illustrated.

According to certain embodiments, FIG. 9 may illustrate a situation in which people are in a building 110 during an emergency situation (e.g. fire, earthquake, terrorist attack, etc.) and wherein a UAV 20 may be used to track and locate mobile devices 93a-93b, 5 and report the information to the rescue services 99 located outside the building 110 and having access to a computer 101 which may have wireless communication 7 with the UAV 20.

According to embodiments, UAV 20 may fly around a building 110 which may have 5 floors (designated as F#1-F#5) and a roof. In the building 110 there are people 94-96 wherein some of them may be in distress situation 96.

The UAV 20 may fly around the building 110 at different heights 91a-91c and perform measurements with the mobile devices 93a-93b, 5 in order to estimate their location in the building 110.

As may be apparent to those skilled in the art, people may be inside the building or on the roof 95-96 and not visible to the rescue services 99 located outside the building 110. The UAV 20 may perform measurements (e.g. measurement 100 with tag 96) with mobile devices 93a-93b, 5 at selected points 92a-92d.

Flying at different heights 91a-91c may be needed to perform a 3D location of the mobile devices 93a-93b, 5 and estimate with a high degree of accuracy the floor in which they are located. This information may be of extreme value to the rescue services.

According to certain aspects of the disclosed embodiments, the 3D location of mobile devices 93a-93b, 5 may be improved by measuring the position of reference RFID tags 97a-97b which may be affixed to the building 110 at different heights. Locating those reference tags 97a-97b may help to minimize or cancel height offset errors which may be generated by the GPS system or altitude control in the UAV 20.

According to certain embodiments, the information collected by the UAV 20 (e.g. mobile devices ID, measurements, flight information, etc.) may be transferred over a wireless link 7 to a computer 101. According to certain aspects of the disclosed embodiments, the computer 101 may estimate the location of the mobile devices 93a-93b, 5 in the building 110 and control the UAV 20 to take photographs or video of certain places in the building 110.

According to certain aspects of the disclosed embodiments, the UAV 20 is commanded to take a photograph of the zone where mobile device 5 was located by computer 101. The imaging system 34 may use a flash light 98a to illuminate the target zone. Similarly, the imaging system 34 may use a flash light 98b to illuminate the target zone in which tag 93b is located. The imaging information may be transferred from the UAV 20 to the computer 101 through the wireless link.

According to certain aspects of the disclosed embodiments, the computer 101 may show maps with the location of mobile devices 93a-93b, 5 and any other related information.

According to certain embodiments, the role of the computer 101 shown in FIG. 9 may be performed by a laptop, a mobile device (e.g. smart phone, tablet), etc.

In certain countries, fix transmitters deployed outdoors, transmitting wireless signals in accordance with IEEE802.15.4a (UWB) is restricted by the government radio regulations. As may be apparent to one skilled in the art using a UAV 20 to perform measurements may have a significant advantage in respect to those restrictions.

Figure 10:
FIG. 10 is a diagram illustrating an exemplary system including an unmanned aerial device flying inside a hangar and several tags attached to people and equipment consistent with disclosed embodiments.

FIG. 10 is a diagram illustrating an exemplary system including an unmanned aerial device flying 20 inside a hangar 120 and several tags 121-122 attached to people and equipment consistent with disclosed embodiments.

Hangars 120 in the aerospace industry have certain characteristics which make them a difficult site for wireless positioning systems. Some of those characteristics are:
  Hangars are very large buildings with huge indoor spaces.
  The ceiling is typically very high (e.g. 20-35 m)
  In many cases, the hangar floor needs to be free of fixed-attached elements to allow the free movement of airplanes.
  In the hangar there are huge metal objects (e.g. airplanes, motors, wings, cranes, sliding doors, platforms, etc.) some of them moving.
  The hangar floor and platforms comprise a large number of assets which move frequently.

Using an UAV 20 flying inside the hangar 120 may provide a good solution to the challenges described above.

According to certain embodiments, a UAV 20 may fly inside the hangar 120 and perform measurements with mobile devices (e.g. RFID tags 121-122) in order to locate certain assets (e.g. lab equipment, parts, tools, etc.). The UAV 20 may be controlled to perform those flights and measurements upon request or periodically. Flying at different heights may also provide the ability to perform a 3D positioning of the mobile devices 121-122 which may be of high value in such a places.

According to certain aspects of the disclosed embodiments, the hangar may comprise one or more wireless transmitter/receiver units 123 installed in a place with good wireless communication with the tags 121-122 in the hangar. According to certain aspects of the disclosed embodiments, the wireless transmitter/receiver unit 123 may be used to trigger tags 121-122 to start measurements, receive tag telemetry, etc.

Figure 11:
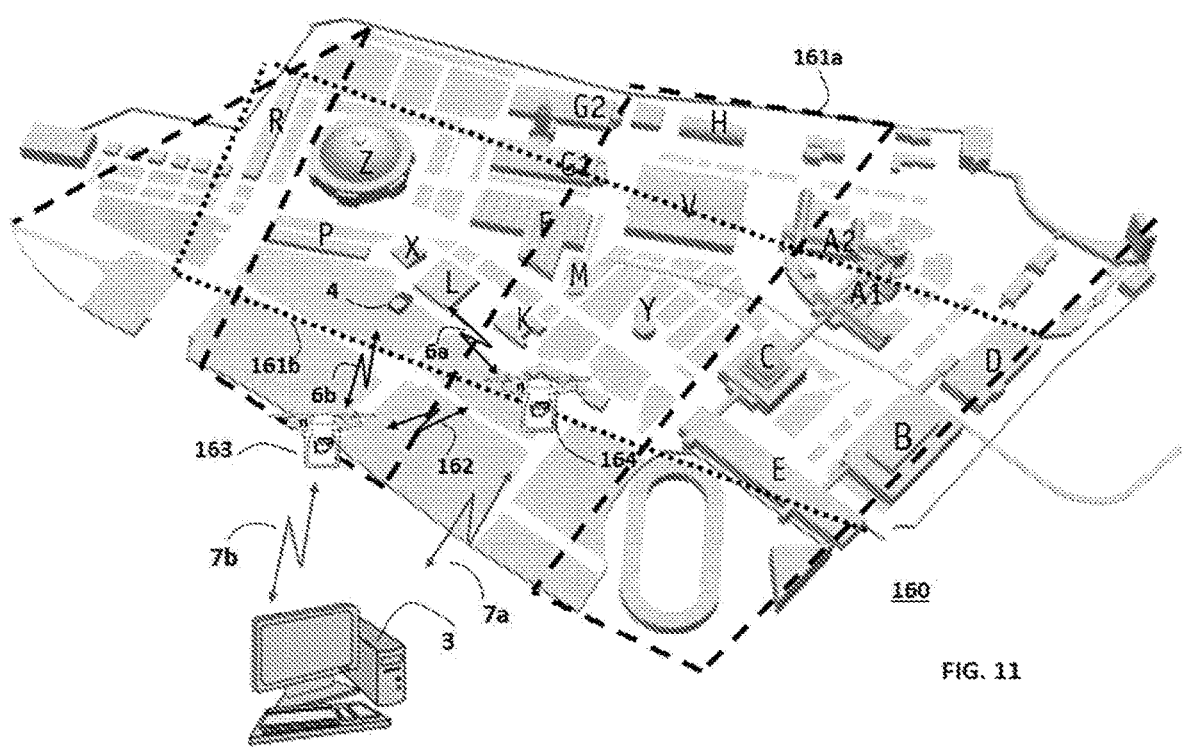
FIG. 11 is a diagram illustrating an exemplary system including two unmanned aerial devices flying in an open area and communicating with a computer, and a wireless tag consistent with disclosed embodiments.

Now referring to FIG. 11, a diagram illustrating an exemplary system including two unmanned aerial devices 163-164 flying in an open area 160 and communicating 7a-7b with a computer 3, and a wireless tag 4 consistent with disclosed embodiments is depicted.

According to certain embodiments, two UAV's 163-164 may be programmed to fly in a certain area 160 following programmed flight paths 161a-161b.

The area 160 may comprise buildings, stadium, roads, gardens etc. as denoted in FIG. 11 by the letters A1, A2, B-E, G1, G2, H, K, L, M, P, R, V, X, Y and Z.

According to certain embodiments, the UAV's 163-164 flying along their trails 161a-161b may independently perform measurement of representative parameters related to the wireless signal 6a-6b (e.g. Received Signal Strength-RSS, Time of Arrival (TOA), Angle of Arrival-AoA, etc.) transmitted by mobile devices 4 in the area 160 as received by UAV's 163-164. The measurements may be performed by UAV's 163-164 at certain points along their trails 161a-161b.

According to certain embodiments, in addition to performing the measurements, the on-board computers 31 in each UAV 163-164 may stamp the geographical coordinates (i.e. longitude, latitude and altitude) of its position at the measurement points and associate them with the respective measurements. The associated information may also comprise a time stamp at each of measurement point and the respective UAV 163-164 speed and direction values.

The measured values of representative parameters related to wireless signal 6a-6b from mobile devices 4 in the area 160, the ID of the mobile device 4 for each of the measured values and the associated information as described in the previous paragraph (i.e. the geographical coordinates of the UAV's 163-164 at the measurements points may be used to estimate the position of the mobile device 4 in the area 160.

According to certain embodiments, the measurements may be done for a plurality of mobile devices and operating in accordance with a plurality of wireless technologies.

According to certain embodiments, the flying path 161a-161b, and/or the start and end points may be defined in accordance to one or more parameters as follows:
  Flying autonomy and capabilities of the UAV's 163-164
  Density of mobile devices in certain zones of the area 160

Minimum Geometric Dilution of Precision (GDOP) in respect to the zones where mobile devices 4 are expected to be.

According to certain aspects of the disclosed embodiments, the mobile devices 4 may be preprogrammed to transmit signals during a defined period of time (e.g. a specific hour during a day, or an interval of 10 min every hour, etc.), wherein the UAV's 163-164 may be programmed to be present in the area 160 to receive those wireless signals and then perform measurements of their representative parameters (e.g. RSS, TOA, etc.).

According to other aspects of the disclosed embodiments, when the UAV's 163-164 are flying in the area 160, they may transmit beacon signals which may trigger the mobile devices 4 to transmit signals during a defined period of time.

According to certain embodiments, the information collected by both UAV's 163-164 (e.g. mobile devices ID, measurements, flight information, etc.) may be transferred over a wireless link 7a-7b to a computer 3. According to certain aspects of the disclosed embodiments, the computer 3 may estimate the location of the mobile devices 4 in area 160 and in some cases may control the UAV's 163-164 to take photographs or video of certain places in that area 160.

The imaging information may be transferred from the UAV's 163-164 to the computer 3 through the wireless link 7a-7b.

According to certain aspects of the disclosed embodiments, the computer 3 may show maps with the location of mobile devices 4 and any other related information.

According to certain embodiments, both UAV's 163-164 may maintain a synchronized clock used for TOA measurements. According to certain aspects of the disclosed embodiments, the UAV's 163-164 can communicate 162 each other. Using symmetrical double sided-two-way ranging (SDS-TWR) as described in FIG. 5, two or more UAV's 163-164 may accurately compute the distance between them and based on that they may calculate the relative time and frequency offset between their clocks. As may be apparent to those skilled in the art, the UAV's 163-164 may perform periodic symmetrical double sided—two-way ranging (SDS-TWR) measurements (e.g. every 50 msec) and then may use adaptive filters (e.g. Kalman filters) to estimate the time offset between their clocks also at times different than when performing the two-way ranging (SDS-TWR) measurements.

According to certain embodiments, a plurality of UAV's 163-164 may perform TOA measurements of wireless signals 6a-6b transmitted by a mobile device 4 and based on their synchronized clocks as described in the previous paragraphs, the Time Difference of Arrival (TDOA) may be calculated.

According to certain embodiments, the information collected by a plurality of UAV's 163-164 (e.g. mobile devices ID, TOA measurements, clock offset information, flight information, etc.) may be transferred over a wireless link 7a-7b to a computer 3 which may estimate the TDOA at a plurality of UAV's 163-164 of wireless signals 6a-6b. A TDOA may be calculated for different pairs of TOA measurements when the UAV's are at different positions along their flying trails 161a-161b. Then, the position of the mobile device 4 may be estimated using multilateration techniques known to one skilled in the art.

According to certain embodiments, mobile devices 4 comprising sensors may be randomly distributed over a large area (e.g. using an airplane). The methods and systems disclosed may be used to locate those mobile devices 4 and also collect from the telemetry information.

The foregoing descriptions have been presented for purposes of illustration and description. They are not exhaustive and do not limit the disclosed embodiments to the precise form disclosed. Modifications and variations are possible in light of the above teachings or may be acquired from practicing the disclosed embodiments. For example, the described implementation comprises software, but the disclosed embodiments may be implemented as a combination of hardware and software. Additionally, although disclosed aspects are described as being stored in a memory on a computer, one skilled in the art will appreciate that these aspects can also be stored on other one or more other types of tangible computer-readable media, such as secondary storage devices, like hard disks, floppy disks, CD-ROMs, or other forms of RAM, ROM, SDRAM, DRAM, Flash memory and the like.

Computer programs based on the written description and disclosed methods are within the capabilities of one of ordinary skill in the art. The various programs or program modules may be created using any of the techniques known to one skilled in the art, or may be designed in connection with existing software. For example, program sections or program modules can be designed in or by means of DirectX, .Net Framework, .Net Compact Framework, Visual Basic, C, XML, Java, C++, JavaScript, HTML, HTML/AJAX, or any other now known or later created programming language. One or more of such software sections or modules may be integrated into a computer system.

Other embodiments will be apparent to those skilled in the art from consideration of the specification and practice of the embodiments disclosed herein. As the recitations in the claims are to be interpreted broadly based on the language employed in the claims and are not limited to examples described in the present specification or during the prosecution of the application, which examples are to be construed non-exclusive.

Further, the steps of the disclosed methods may be modified in any manner, including by reordering steps and/or inserting or deleting steps.

Further, since numerous modifications and variations will readily occur to those skilled in the art, it is not desired to limit the disclosure to the exact construction and operation illustrated and described, and accordingly, all suitable modifications and equivalents may be resorted to, falling within the scope of the disclosure.

What is claimed is:

1. A method for locating mobile devices in an area, comprising:
 separately receiving, by first and second unmanned aerial vehicles (UAVs) at each of a plurality of locations, wireless signals from a mobile device, the first and second UAVs flying in wireless communication range with the mobile device,
  wherein the wireless signals transmitted from the mobile device at the plurality of locations comprise identification information of the mobile device, and further comprise bursts transmitted at short and long transmission intervals, wherein the long interval is significantly longer than the short interval,
  wherein the plurality of locations of the first and second UAVs are selected taking into account a reduction of location errors caused by Geometric Dilution Of Precision (GDOP), when locating the mobile device;
 measuring, by the first UAV, a Time of Arrival (TOA) of each burst of the wireless signals as received by the first UAV at the plurality of locations;

measuring, by the second UAV, the TOA of each burst of the wireless signals as received by the second UAV at the plurality of locations;

associating, by the first UAV, TOA values at the time each burst of the wireless signals was received with the mobile device identification and with the location of the first UAV the time the wireless signals were received at the plurality of locations;

associating, by the second UAV, TOA values at the time each burst of the wireless signals was received with the mobile device identification and with the location of the second UAV at the time the wireless signals were received at the plurality of locations;

calculating a time offset between a mobile device clock and a first UAV clock based on the measured TOA by the first UAV of wireless signal bursts received at short intervals;

establishing communication between the first and second UAVs and a computer, the computer separated from the first and second UAVs;

reporting to the computer, by the first and second UAVs, the mobile device identification, the associated TOA values and the associated location information of the respective UAV at the time the wireless signals were received;

synchronizing a second UAV clock with the first UAV clock, and wherein a Time Difference of Arrival (TDOA) is calculated based on the TOA values respectively measured by the first and second UAVs at long intervals;

calculating the TDOA of wireless signal bursts based on the measured TOA of wireless signal bursts received at long intervals and said offset; and estimating, the location of the mobile device in the area based on the calculated TDOA values and the location of the first and second UAVs at the times they received the wireless signal bursts.

2. The method of claim 1, wherein the location of the mobile device in the area is estimated by being additionally based on a measured representative parameter selected from at least one of:
Received Signal Strength (RSS);
Time-of-flight (ToF);
Two-way ranging (TWR), symmetrical double sided two-way ranging (SDS-TWR);
Angle of Arrival (AoA);
Near-field electromagnetic ranging (NFER);
Phase of received signal; and
Frequency of the received signal.

3. The method of claim 2, further comprising:
time-stamping, by the first and second UAVs, the measurement of the representative parameter; and
calculating, the location of the first and second UAVs at the times the wireless signals were received, based on the time stamps and flight information of the first and second UAVs.

4. The method of claim 1, wherein the wireless signal from the mobile device is according to one of:
IEEE802.11a/b/g/n/ac/ad
IEEE802.15.4
IEEE802.15.4a
Bluetooth 4.0/5.0
Wireless HART
NB-IoT
LTE Cat0 for M2M, LTE-M Rel. Cat-0, Cat-1 and Cat-4
LoRaWAN™, Low Power Wide Area Network (LPWAN)
SIGFOX
Weightless-N, Weightless-P, Weightless-W
Z-Wave
3G/4G cellular.

5. The method of claim 1 wherein the location of the mobile device in the area is estimated by being additionally based on a representative parameter measured by the first and second UAVs, which is selected from at least one of:
Received Signal Strength (RSS);
Two-way ranging (TWR), symmetrical double sided two-way ranging (SDS-TWR);
Angle of Arrival (AoA);
Phase of received signal; and
Frequency of the received signal.

6. The method of claim 1 wherein the location of the first and second UAVs at the time the wireless signals were received is provided by a GPS receiver in each of the respective UAVs.

7. The method of claim 1, further comprising:
pointing, by the first or second UAVs, an on-board imaging device to the location of the mobile device in the area, the pointing based on the estimated location of the mobile device and the location and orientation of the pointing UAV; and
capturing, by the on-board imaging device, at least one image of the area in which the mobile device is located; and
reporting the at least one image to the computer.

* * * * *

UNITED STATES PATENT AND TRADEMARK OFFICE
CERTIFICATE OF CORRECTION

PATENT NO. : 10,771,923 B2
APPLICATION NO. : 16/316559
DATED : September 8, 2020
INVENTOR(S) : Daniel Aljadeff It is certified that error appears in the above-identified patent and that said Letters Patent is hereby corrected as shown below:

In the Specification

At Column 3, Line 36; change "WEE802.11a/b/g/n/ac/ad" to "IEEE802.11a/b/g/n/ac/ad"

At Column 3, Line 61; change "WEE802.15.4" to "IEEE802.15.4"

At Column 10, Line 34; change "WEE802.15.4a" to "IEEE802.15.4a"

At Column 14, Line 55; change "WEE802.11n" to "IEEE802.11n"

At Column 17, Line 3; change "msec" to "m/sec"

In the Claims

At Claim 1, Column 25, Line 7; amend "... first UAV the time ..." to "... first UAV at the time ..."

Signed and Sealed this
Twenty-fourth Day of November, 2020

Andrei Iancu
*Director of the United States Patent and Trademark Office*